Dec. 3, 1940.   E. E. CHRYSLER   2,224,038
REDUCTION GEAR REVERSE CLUTCH
Filed Jan. 26, 1938
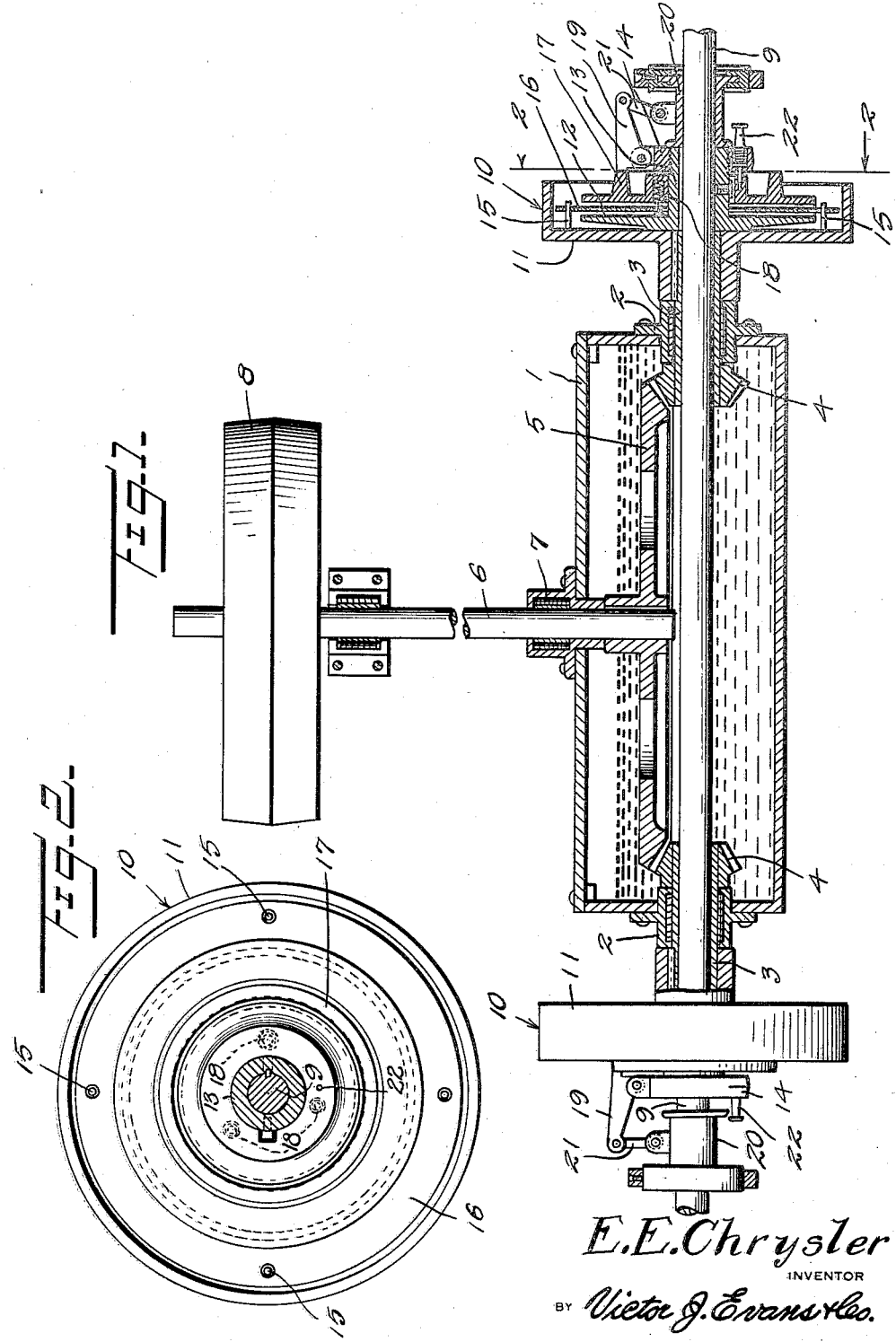
E.E.Chrysler
INVENTOR
BY Victor J. Evans & Co.
ATTORNEY Patented Dec. 3, 1940

2,224,038

UNITED STATES PATENT OFFICE 2,224,038

REDUCTION GEAR REVERSE CLUTCH

Everett E. Chrysler, Casey, Ill.; Russell B. Miller administrator of said Everett E. Chrysler, deceased Application January 26, 1938, Serial No. 187,068

1 Claim. (Cl. 192—68)

This invention relates to a reduction gear reversing clutch power unit especially adapted for transmitting power from either a high or low speed power source to a driven device which may be a deep well pump or other well machinery, and has for the primary object the provision of a device of this character which will permit reversing of the driven well machine while the device is under load without shock or vibration and will be easy to install, cheap to manufacture and maintain in operation and will be durable, efficient and compact in construction permitting easy handling thereof from one place to another and convenient to control when in use.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a top plan view, partly in section, illustrating a reduction gear reverse clutch constructed in accordance with my invention.

Figure 2 is a sectional view taken on the line 2—2 of Figure 1.

Referring in detail to the drawing, the numeral 1 indicates a gear housing which may contain lubricant and opposite ends thereof are equipped with journals 2 preferably employing anti-friction rollers to rotatably support pinion sleeves 3. Said sleeves are arranged to be partly located within the housing 1 and exteriorly of the latter and are formed integrally with pinions 4 arranged in the housing and mesh with a ring gear 5 at diametrically opposite points on the latter. The ring gear is secured on a power takeoff shaft 6 supported by journals 7, one of which is carried by the housing 1 and the other may be supported in any well known manner. The power takeoff shaft 6 is equipped with a pulley wheel 8 so that the power takeoff shaft may be belted to different types of well machinery.

A power shaft 9 is driven from any suitable power source either of the low or high speed type and is rotatably supported by the sleeves 3 and extends through the housing. To establish driving connection between the power shaft 9 and the sleeve 3 are clutches 10 which may be independently controlled or simultaneously controlled so that either of the sleeves may be clutched to the power shaft. The clutches permit driving of the driven shaft in opposite directions and the direction of rotation of the driven shaft may be reversed at any time desired while the device is under load through the manipulation of the clutches.

Each clutch consists of a housing 11 keyed or otherwise secured on its respective sleeve 3 and keyed on the drive shaft is an inner clutch disc 12 including a hub portion 13 screw threaded to have threaded thereon a dog supporting collar 14. The inner clutch disc has a portion thereof bearing against the housing 11 and the latter is equipped with pins 15 to support a floating clutch plate 16 by extending through openings located adjacent the periphery of said clutch plate 16. An outer clutch disc 17 is slidable on the hub portion 13 of the inner clutch disc and interposed between the inner and outer clutch discs is the floating clutch plate 16 and also coil springs 18 acting to separate the clutch discs and the plate 16. Pivoted on the collar 14 is a dog 19 engageable with the outer clutch disc 17 and is connected to a sleeve 20 slidable on the power shaft by a link 21. An operating means (not shown) is connected to the sleeves 20 for sliding the same in opposite directions to bring about clutching and unclutching of the clutches 10. A sliding movement of the sleeve 20 in one direction brings about pivotal movement of the dog 19 forcing the outer clutch disc tightly against the floating clutch plate and the latter tightly against the inner clutch disc thereby establishing a drive between the power shaft and the sleeves 3.

The ratio of the ring gear 5 in relation to the ratio of the pinions 4 is such that a reduction drive is established between the drive shaft and the driven shaft by either of said pinions when they are active in the transmission of power from the drive shaft to the driven shaft.

Each plate 17 is slidably keyed to the hub 13 of the adjacent plate 12 by a key and slot construction as illustrated in Figure 1 of the drawing. The collar 14 of each clutch has mounted therein a spring pressed pin 22, the latter having an inner end normally disposed within the socket formed on the outer face of the disk or plate 17 whereby to preclude accidental turning of the collar relative to the plate 17 and hub 13. By moving the inner end of the pin out of the socket of the disk or plate 17 the collar 14 may be adjusted inwardly to effect inward movement of the disk 17 and thereby compensate for wear on the clutch plate 16, it being understood that after the aforementioned adjustment is made the pin 22 is released and the inner end of the latter disposed within the socket.

What is claimed is:

In combination with a pair of relatively rotatable shafts one mounted within the other, a clutch housing fixed to one of said shafts for rotation with the latter, an inner clutch disk within said housing and formed with a hub fixed to said other shaft for rotation with the latter, an outer clutch disk slidably keyed on said hub and operable towards and away from said inner clutch disk, a clutch plate arranged between said disks, axially disposed pins carried by said housing and slidably connecting said plate to the latter against relative rotation, resilient means mounted between said disks for urging said outer disk away from said inner disk and said plate, means mounted on said hub and detachably locked to said outer disk, and means connected to said last mentioned means and operable for moving said outer disk towards said inner disk to clamp said plate between both of said disks to effect unitary rotation of said shafts.

EVERETT E. CHRYSLER.